Dec. 25, 1962 E. S. BARA 3,070,321

AUTOMATIC CONTROL FOR TAPE RECORDERS

Filed Aug. 26, 1960 3 Sheets-Sheet 1

INVENTOR:
EDWIN S. BARA
BY
Watson D. Harbaugh
ATT'Y

Dec. 25, 1962 E. S. BARA 3,070,321

AUTOMATIC CONTROL FOR TAPE RECORDERS

Filed Aug. 26, 1960 3 Sheets-Sheet 2

INVENTOR:
EDWIN S. BARA
BY
Watson D. Harbaugh
ATT'Y

Dec. 25, 1962 E. S. BARA 3,070,321

AUTOMATIC CONTROL FOR TAPE RECORDERS

Filed Aug. 26, 1960 3 Sheets-Sheet 3

INVENTOR:
EDWIN S. BARA
BY
Watson D. Harbaugh
ATT'Y 3,070,321

AUTOMATIC CONTROL FOR TAPE RECORDERS

Edwin S. Bara, Chicago, Ill., assignor to Webcor, Inc., Chicago, Ill., a corporation of Illinois
Filed Aug. 26, 1960, Ser. No. 52,146
21 Claims. (Cl. 242—55.12)

This invention relates to an automatic control for tape recorders particularly magnetic tape recorders, in which the tape is adapted to travel in two directions.

An object of this invention is to provide in a tape recorder of this character a plurality of push-button controls for operating a tape recorder.

Yet, another object of this invention is in the provision in a tape recorder of this character of a means for controlling the speed of movement of the tape through the recorder.

A further object of this invention is in the provision in a tape recorder of this character of a means for automatically reversing the direction of travel of the tape upon approaching the end of the tape as mounted on a tape reel.

A still further object of this invention is in the provision in a tape recorder of this character of a control means for selecting the direction of travel of the tape through the recorder.

Another equally important object of this invention is in the provision in a tape recorder of this character of an arrangement of parts wherein the recorder together with its automatic controls may be readily adjusted to accept tape reels of different diameters.

Other objects will appear hereinafter.

The invention consists in the novel combination and arrangement of parts to be hereinafter described and claimed.

The invention will be best understood by reference to the accompanying drawings showing the preferred form of construction, and in which.

The present invention relates to a simplified push-button control for a magnetic tape recorder which controls the operation of the tape recorder, the direction of travel of the tape and the speed of the tape through the recorder.

Figure 1:
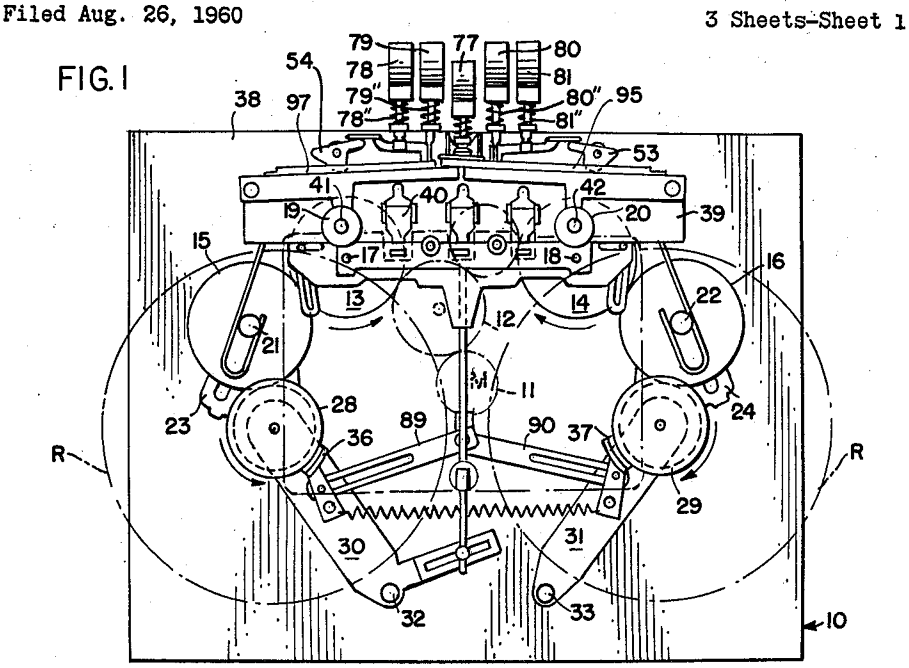
FIG. 1 is a plan view of the automatic control mechanism for a tape recorder.

Referring to FIG. 1 there is shown a mounting plate 10. To the rear side of this mounting plate 10 is operatively connected a suitable electric motor 11. This motor 11 operates a drive wheel 12. This drive wheel 12 is so constructed and operates in a well known manner in the art so that it will rotate the capstan pulley wheels 13 and 14, mounted upon the face of the plate 10 in opposite directions.

The capstan pulley wheels 13 and 14 in turn have frictional driving contact with idler wheels 15 and 16 respectively. The mounting shafts 17 and 18 of the capstan pulley wheels 13 and 14 respectively extend laterally from the mounting plate 10 and are adapted to be selectively engaged by capstan rollers 19 and 20 in a manner and for a purpose hereinafter explained.

Figure 2:
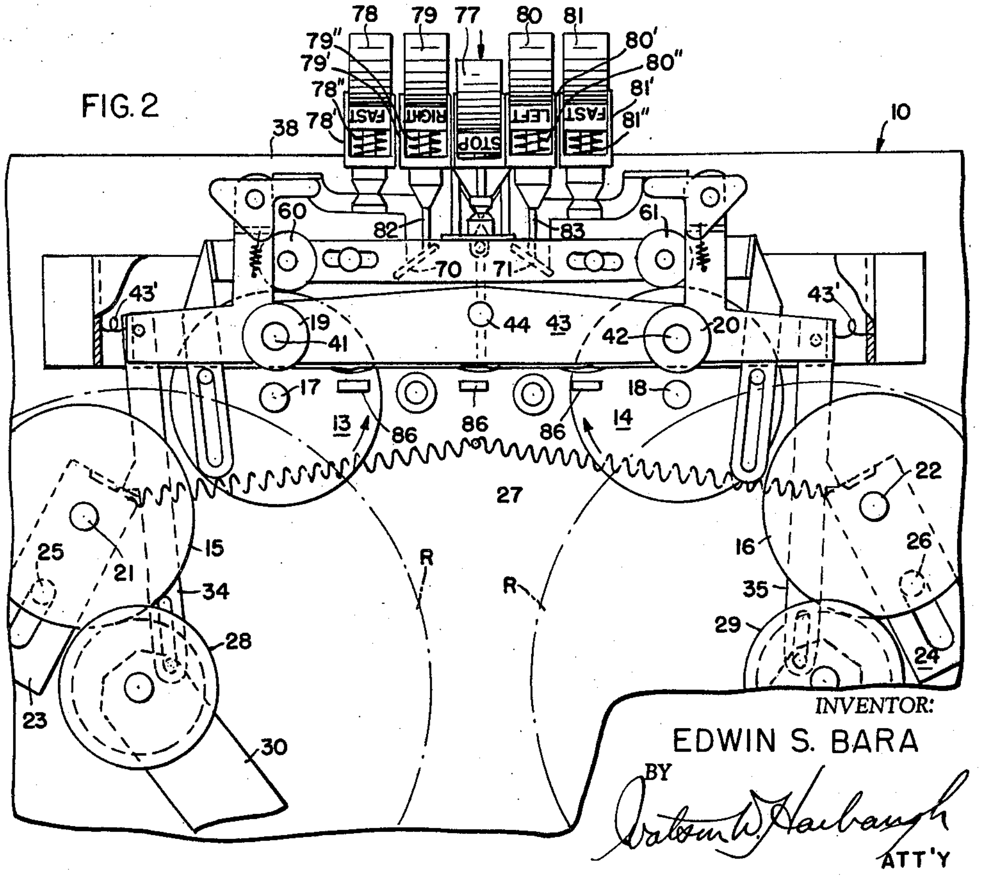
FIG. 2 is a fragmentary detailed view of the automatic control for a tape recorder.
Figure 3:
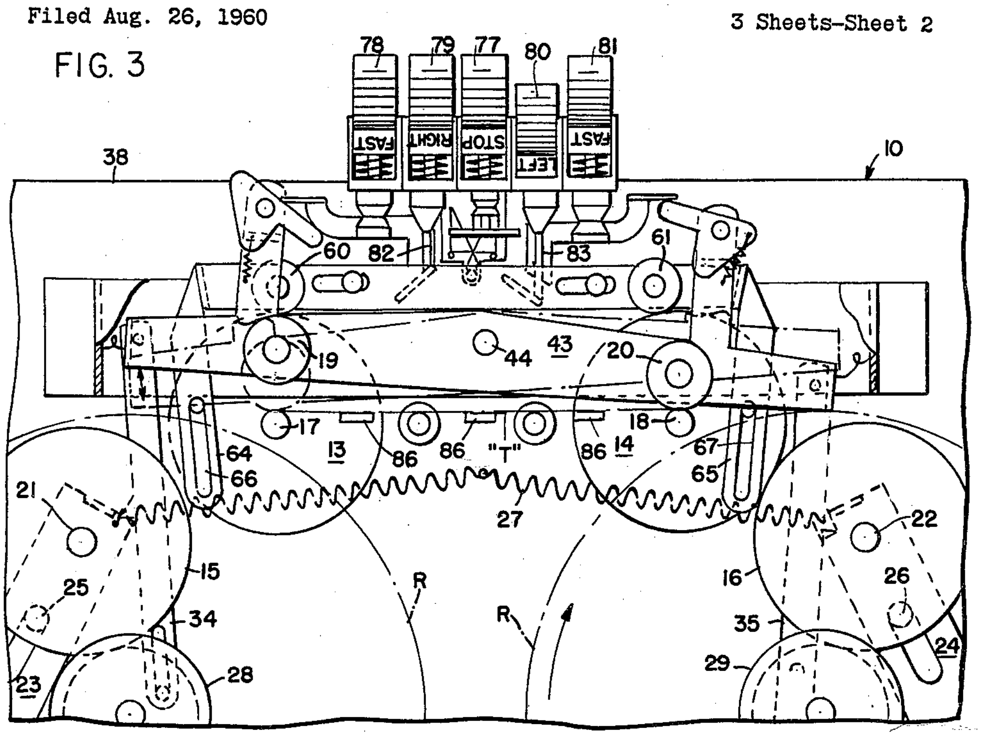
FIG. 3 is a fragmentary detailed view of the automatic controls for the tape recorder in one of its operative positions.
Figure 4:
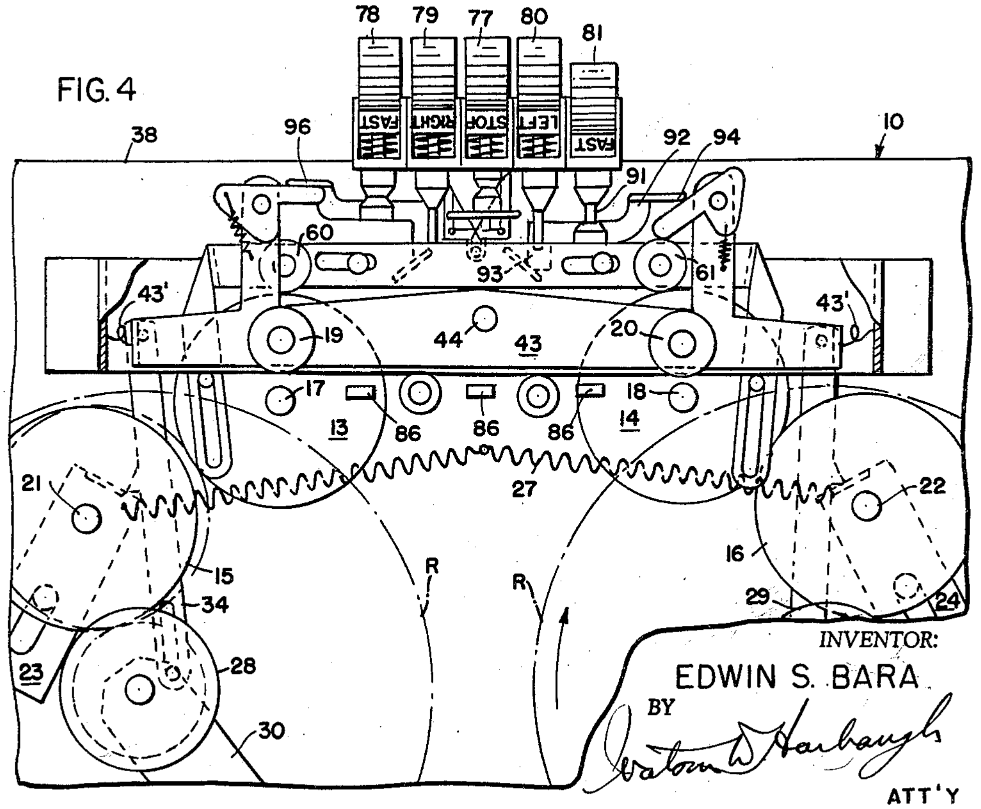
FIG. 4 is a fragmentary detailed view of the automatic controls for the tape recorder in one of its other operative positions.
Figure 5:
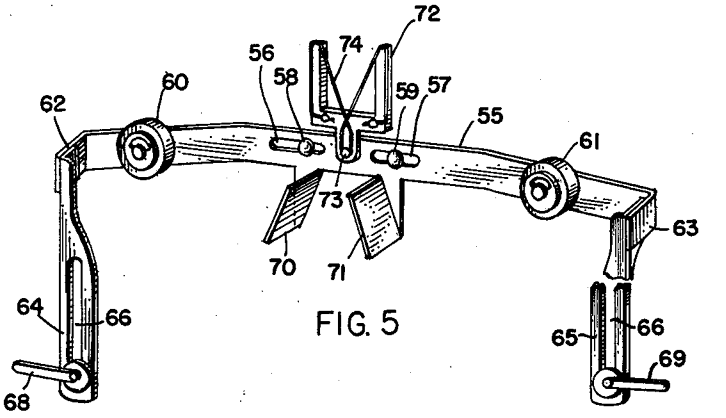
FIG. 5 is a perspective view of the directional slide bar incorporated in the control mechanism for the tape recorder.

The idler wheels 15 and 16 are rotatably carried by shafts 21 and 22 respectively each of which are in turn mounted on movable plates 23 and 24. These plates 23 and 24 are connected to the mounting plate 10 by means of a pin and slot connection 25 and 26 respectively. The free ends of the plates 23 and 24 are yieldably connected together by a spring 27 as seen in FIGS. 2, 3 and 4. The idler wheels 15 and 16 will in turn, by a construction hereinafter explained, alternately engage the shank of tape reel spindles 28 and 29.

The spindles 28 and 29 for tape reels R are rotatably carried by mounting plates 30 and 31. The opposite ends of each of the plates 30 and 31 are pivotally connected as at 32 and 33 respectively to the face of the mounting plate 10 as seen in FIG. 1. Each of the plates 30 and 31 is connected by means of a pin and slot connection to the lower end of the position levers 34 and 35 respectively. Pivotally carried by each of the plates 30 and 31 is a felt pressure arm and pad 36 and 37 which are adapted to engage a portion of the outer periphery of the reel spindles 28 and 29.

Figures 6, 7:
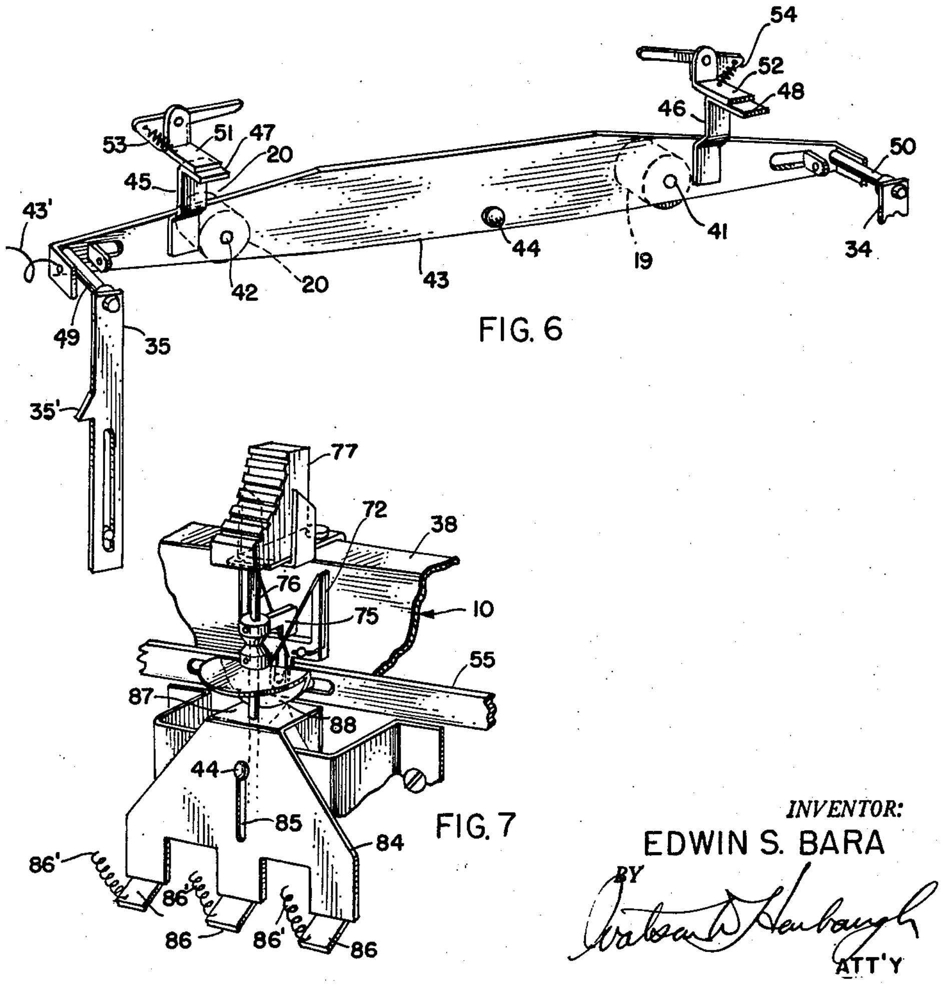
FIG. 6 is a perspective view of the directional tilt bar incorporated in the control mechanism for the tape recorder.
FIG. 7 is a fragmentary detailed view of one of the push-button controls and its associated parts as incorporated in the control mechanism for the tape recorder.

Mounted on the face of the mounting plate 10 adjacent one edge 38 thereof and extending in spaced apart parallel relation thereto is an elongated table bar 39. This table bar 39 provides mounting sockets 40 for the recording and erasing heads of the tape recorder. This table bar is adapted to extend over a portion of the capstan pulley wheels 13 and 14 as seen in FIG. 1. The shafts 17 and 18 of the capstan pulley wheels 13 and 14 are of such a length that they extend beyond and beneath the table bar 39. Formed in the face of the table bar 39 in alignment with the shafts 17 and 18 are elongated slots through which projects the mounting shafts 41 and 42 of capstan rollers 19 and 20. The capstan rollers 19 and 20 rotatably mounted on shafts 41 and 42 which in turn are mounted on to a pivot bar 43 which is pivotally connected by means of a rivet 44 to the underside of the table bar 39. Intermediate the ends of the pivot bar 43 as seen in FIG. 6 are vertically extending arms 45 and 46 which terminate into horizontally extending tabs 47 and 48. The opposite free ends of the pivot bar 43 are provided with laterally extending lugs 49 and 50 which are each in turn connected to the free ends of the positioning levers 34 and 35. Carried by each of the tabs 47 and 48 are L-shaped mounting brackets 51 and 52 which in turn pivotally support cam fingers 53 and 54 the purpose and function of which will be hereinafter made apparent.

Mounted to the mounting plate 10 beneath the table bar 39 and extending in a parallel direction with respect thereto, is a slide bar 55. This slide bar 55 is provided with respect to the mounting plate 10. Intermediate the projects mounting rivets 58 and 59 carried by the mounting plate 10. By such an arrangement it is apparent that the slide bar 55 has a longitudinal slidable connection with respect to the mounting plate 10. Intermediate the ends of the slide bar 55 there is rotatably mounted rubber rollers 60 and 61. The slide bar 55 is so designed that the rollers 60 and 61 will have alternate frictional engagement with the capstan pulley wheels 13 and 14 depending upon the relative longitudinal position of the bar 55 with respect to such pulley wheels. The opposite ends of the slide bar 55 are formed to present mounting lugs 62 and 63 upon which there is mounted depending arms 64 and 65.

The lower ends of the arms 64 and 65 are slotted as at 66 and 67. Adapted to be slidably mounted in the slots 66 and 67 are laterally projecting sensing fingers 68 and 69. The function and operation of which will be hereinafter explained.

Intermediate the ends of the slide bar 55 and depending therefrom are converging cam surfaces 70 and 71. Extending vertically from the bar 55 and directly between the cam surfaces 70 and 71 is a U-shaped bracket 72. From the free ends of the arms of the U-shaped bracket 72 and extending down to a center pin 73 positioned in the center of the right portion of such U-shaped bracket 72 is a centering cross-wire 74. The above described centering device which is of a construction and operation well-known in the art is adapted to operate on a laterally extending finger 75 carried by longitudinally extending rod 76 which is an operative part of the "stop" push-button 77 of the controls as viewed in FIG. 7.

The automatic control mechanism of this invention contemplates the use of push-buttons. Each of the push-buttons 77 to 81 inclusive are supported by U-shaped brackets 77' through 81' respectively carried by the edge 38 of the mounting plate 10. With respect to the push-buttons 78 through 81, it should be noted that each has associated therewith a coil spring 78'' through 81'' so that such buttons after being actuated by being depressed will return to their normal position. The push-button 77 does not have a spring associated therewith and therefore when it is depressed as seen in FIG. 7 it will remain in such position until it is mechanically restored. The mechanical operation of returning the push-button 77 to its normal inoperative position (its raised position) is a result of the positioning of the center crosswire 74 with respect to the finger 75 carried by such push-button 77.

With respect to the push-button controls, applicant wishes to point out that the push-buttons 78 and 81 are adapted to effect a mechanical movement which controls the speed of movement of the tape "T" through the recorder. Push-buttons 79 and 80 control the direction of travel of the tape through the recorder in that upon actuation of the push-button 79 a mechanical operation which will be hereinafter described will take place causing the tape to move through the mechanism from left to right as viewed in FIGS. 1 through 4. The actuation of the push-button 80 will cause the tape to move through the machine from right to left as viewed in FIGS. 1 to 4.

Referring specifically to FIG. 2 it can be readily noted that each of the push-buttons 79 and 80 are provided with depending rods 82 and 83 which under certain circumstances will have selected engagement with the cam surfaces 70 or 71 carried by the slide bar 55. As an example, upon depression of push-button 80 its rod 83 will engage the cam surface 71 and cause slide bar 55 to move to the left as seen in FIG. 3. The same result would be achieved if the push-button 79 were depressed with the exception that the slide bar 55 would be moved to the right as viewed in FIG. 3 rather than to the left as is shown.

Adapted to be slidably mounted on the rivet 44 which pivotally connects the pivot bar 43 to the table bar 39 is a triangularly shaped plate 84. Formed in the plate 84 is an elongated slot 85 through which projects the head of the rivet 44. Projecting laterally from the bottom of the plate 84 in a direction away from the mounting plate 10 are a plurality of felt positioning pads 86. These felt positioning pads 86 are adapted to receive and support the tape "T" and move the same into correct position with the recording and erasing heads carried by the table bar 39.

Laterally projecting from the plate 84 at the top thereof and extending in the direction of the mounting plate 10 is a plate surface 87. Mounted on the rod 76 carried by and movable with the push-button 77 is a cam plate 88. When the "stop" push-button 77 is depressed or in its operative position as shown in FIG. 7, the cam plate 88 will have engaged the plate surface 87 of the plate 84 and cause the same to move in a downward direction until the head of the rivet 44 engages the upper end of the slot 85. In such position the felt pads 86 will permit the tape "T" to be out of engagement with the recording and erasing heads of the apparatus. The position of the push-button 77 as shown in FIGS. 1 and 7 is in what is to be termed the "stop" position whereby the tape reels are not being rotated and the tape is not in an operative relation with the recording and erasing heads of the apparatus. The slide bar 55 is in a neutral position and the pivot bar 43 is in a neutral position.

Referring to FIGS. 1 and 2 we note the condition of the apparatus where the motor 11 is energized causing the rotation of the capstan pulley wheels 13 and 14 in the direction of their respective arrows and which in turn causes rotation of the idler wheels 15 and 16 in the direction of the arrows shown thereon. It should be noted that in this position the idler wheels 15 and 16 are out of engagement with the reel spindles 28 and 29. The tape "T" is not moving in either direction as the reel spindles 28 and 29 are not at this time rotating. The reel spindles 28 and 29 are being held against rotation by reason of the pressure arms and pads 36 and 37. These pressure arms and pads 36 and 37 have been pivoted into engagement with the reel spindles 28 and 29 by the lower positioning of rod 76 which is operatively connected to the "stop" push-button 77. The rod 76 has fixedly connected thereto oppositely extending arms 89 and 90 which in turn have pivotal connection with the pressure arms 36 and 37 intermediate the ends thereof. Thus, as the arms 36 and 37 at one end thereof are pivotally connected to the plates 30 and 31 the movement of the arms 89 and 90 will pivot the pressure arms 36 and 37 into or out of engagement with the reel spindles 28 and 29.

If the operator of the machine wishes to have the tape "T" travel from left to right, he depresses push-button 80 as seen in FIG. 3. The depression of the push-button 80 causes the rod 83 carried thereby to engage the cam surface 71 of the slide bar 55 causing such slide bar to move to the left as viewed in FIG. 3. As the slide bar 55 moves to the left the roller 60 carried thereby will move into engagement with and be rotatably wedged between the capstan pulley wheel 13 and the tab 48 of the rocker bar 43 causing the rocker bar 43 to pivot in a clockwise direction about the rivet 44. The pivoting of the rocker bar 43 in the clockwise direction will cause capstan roller 20 to move downwardly into engagement with the shaft 18 of the capstan pulley wheel 14 as seen in FIG. 3.

Pivotal movement of the pivot bar 43 is expedited by the presence of over-center action spring 43' which connects the opposite ends of the pivot bar 43 to the table bar 39.

Pivotal movement of the pivot bar 43 in its clockwise direction will cause downward movement of the positioning lever 35. A laterally extending lug 35' carried by the lever 35 will engage a finger 24' laterally projecting from the end of the plate 24 upon which is rotatably mounted the idler wheel 16. By such engagement the plate 24 is caused to pivot in an anti-clockwise direction as seen in FIGS. 3 and 4 about its pin and slot connection 26 thus causing the idler wheels 16 carried thereby to move into engagement with the reel spindle 29 rotating the same in a clockwise direction.

By depressing the push-button 80 we have caused the slide bar 55 to move to the left. Movement of the slide bar 55 will in turn cause the centering device carried thereby to be moved in a like direction. The centering crosswire 74 will engage the finger 75 carried by the rod 76 of the push-button 77. The movement to the right of the crosswire 74 will force the finger 75, the rod 76 and the push-button into its inoperative or raised position as seen in FIG. 3. The movement of the rod 76 has in turn caused pivotal movement of the arms 89 and 90 which in turn has pivoted the pressure arms and pads 36 and 37 out of engagement with their respective reel spindles 28 and 29. The release of the reel spindle 29 will permit the same to rotate in the direction of the arrow as shown in FIG. 3 by reason of its engagement with the periphery of the idler wheel 16 which in turn has a driven connection with the capstan pulley wheel 14. As the rod 76 is caused to move upwardly the cam surface 88 carried thereby will be disengaged from the plate surface 87 of the plate 84 thus permitting the felt pads 86 to move upwardly under tension of the springs 86′ so as to engage and position the tape "T" in proper relation with respect to the reproducing and erasing heads of the apparatus. It should also be noted that the tape "T" has been caused to pass between the shaft 18 and the capstan roller 20 and so moved from left to right through the apparatus.

In threading the tape "T" through the apparatus it is caused to pass between the shafts 17 and 18 and the capstan rollers 19 and 20 as well as over the felt positioning pads 86. The tape "T" is also passed around the sensing fingers 68 and 69 carried by the depending arms 64 and 65 of the slide bar 55.

In the explanation of operation heretofore described wherein the tape "T" is caused to travel from left to right with respect to FIGS. 1 to 4, it is apparent that the tape "T" is being unwound from a tape reel on spindle 28 and being wound upon a reel on spindle 29. It is contemplated that the ends of the tape be fixedly attached to their reels and therefore never completely unwound from either reel. It is contemplated by this invention to automatically reverse the direction of travel of the tape "T" upon the approach of the end of the tape "T" as it is being withdrawn from the empty reel. To achieve this result I have provided the sensing fingers 68 and 69, the operation of which is now described. As the end of the tape on the empty reel is reached, the continuing winding action of the full reel will cause the tape "T" to exert a pulling action on the sensing finger 68. In the description of operation hereinbefore recited, this pulling action upon the finger 68 will cause the slide bar 55 to move in an opposite direction, or to the right. Upon movement of the slide bar 55 to the right the roller 61 thereof will be rotatably wedged between the tab 47 of the pivot bar 43 and the capstan pulley wheel 14 causing the pivot bar 43 to pivot in anti-clockwise direction as seen in FIGS. 1 through 4, thus effecting a driving connection between the idler wheel 15 and the reel spindle 28 reversing the operation of the apparatus.

It is contemplated that in certain circumstances the operator of the apparatus may desire to wind or unwind tape "T" in either direction at an increased speed. In order to achieve this desired result the apparatus contains speed control push-buttons 78 and 81.

In viewing FIG. 4 it is noted that the speed control push-button 81 has been depressed against the action of its spring 81″. The push-button 81 is provided with a depending rod 91. This rod 91 has connected thereto at one end a lever 92. One end 93 of the lever 92 is formed so as to engage the cam surface 71 of the slide bar 55 causing the same to move to the left. The opposite end 94 of the lever 92 is caused to bear upon a cam finger 53. This cam finger 53 is caused to be pivoted in a downward direction so as to bear upon a lever 95 carried by the table bar 39 (FIG. 1) which lever in turn has a free end resting upon the cam plate 88. Such downward movement of the lever 95 will cause the cam plate 88 to engage the plate surface 87 of the plate 84 causing the same to move in a downward direction so as to disengage the felt positioning pads 86 from engagement with the tape "T" thus permitting it to move through the apparatus out of contact with the recording and erasing heads with the capstan rollers free of the capstan.

For controlling the speed of the tape "T" in the opposite direction it should be noted that the speed control push-button 78 has a like lever 96 connected thereto which in turn will actuate the cam finger 54 causing it in turn to actuate a like lever 97 for disengaging the felt positioning pads 86 from the tape "T" to free the tape from any drag at the heads. From the foregoing description it is thus apparent that each of the speed control push-buttons 78 and 81 are related to the directional push-buttons 79 and 80 in determining the direction of travel of the tape "T" and as long as either one is depressed it will control the speed of movement of such tape "T".

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

What is claimed is:

1. An automatic control for a dual directional tape recorder having a recording head and including a plurality of push-buttons having operative and inoperative positions, means having an operative and inoperative position for moving a tape through said recorder, said moving means being responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, means movable in one direction when said one of said buttons is moved into its inoperative position by said positioning means for positioning said tape in an operative relation with respect to the recording head provided by the recorder and means urging said movable means in said one direction.

2. An automatic control for a dual directional tape recorder having a recording head and including a plurality of push-buttons having operative and inoperative positions, means having an operative and inoperative position for moving a tape through said recorder, said moving means responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, means movable in one direction when said one of said buttons is moved into its inoperative position by said positioning means for positioning said tape in an operative relation with respect to the recording head provided by the recorder, means resiliently urging said movable means in said one direction and means for selecting the speed of travel of the tape as it is moved in either direction through the recorder by said moving means.

3. An automatic control for a dual directional tape recorder having a recording head and including a plurality of push-buttons having operative and inoperative positions, means having an operative and inoperative position for moving a tape through said recorder, said moving means responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, means movable in one direction when said one of said buttons is moved into its inoperative position by said positioning means for positioning said tape in an operative relation with respect to the recording head provided by the recorder, means urging said movable means in said one direction and means actuated by the tape as it nears the end of its travel in one direction for actuating said positioning means for automatically reversing the travel of the tape through the recorder by said moving means.

4. An automatic control for a dual directional tape recorder having a recording head and including a plurality of push-buttons having operative and inoperative positions, means having an operative and inoperative position for moving a tape through said recorder, said moving means responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, means disposed in one direction when said one of said buttons is moved into its inoperative position by said positioning means for positioning said tape in an operative relation with respect to the recording head provided by the recorder, means for urging said disposed means in said one direction, means for selecting the speed of travel of the tape as it is moved in either direction through the recorder by said moving means, and means actuated by the tape as it nears the end of its travel in one direction for actuating said positioning means for automatically reversing the travel of the tape through the recorder by said moving means.

5. An automatic control for a dual directional tape recorder including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction.

6. An automatic control for a dual directional tape recorder including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, and means for selecting the speed of travel of the tape as it is moved in either direction through the recorder by said moving means.

7. An automatic control for a dual directional tape recorder including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, and means actuated by the tape as it nears the end of its travel in one direction for actuating said slide bar and pivot bar for automatically reversing travel of the tape through the recorder by said moving means.

8. An automatic control for a dual directional tape recorder including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carred thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, means for selecting the speed of travel of the tape as it is moved in either direction through the recorder by said moving means, and means actuated by the tape as it nears the end of its travel in one direction for actuating said slide bar and pivot bar for automatically reversing travel of the tape through the recorder by said moving means.

9. An automatic control for a dual direction tape recorder having a recording head and including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, means disposed in one direction when said one of said buttons is moved in its inoperative position by said slide bar for positioning said tape in an operative relation with respect to the recording head provided by the recorder and means urging said disposed means in said one direction.

10. An automatic control for a dual direction tape recorder having a recording head and including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, means disposed in one direction when said one of said buttons is moved in its inoperative position by said slide bar for positioning said tape in an operative relation with respect to the recording head provided by the recorder, and means for selecting the speed of travel of the tape as it is moved in either direction through the recorder by said moving means.

11. An automatic control for a dual direction tape recorder having a recording head and including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons for effecting operation of said moving means for moving the tape through the recorder in either direction, means movable in one direction with said one of said buttons when moved in its inoperative position by said slide bar for positioning said tape in an operative relation with respect to the recording head provided by the recorder, and means actuated by the tape as it nears the end of its travel in one direction for actuating said slide bar and pivot bar for automatically reversing travel of the tape through the recorder by said moving means.

12. An automatic control for a dual direction tape recorder having a recording head and including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, means movable in one direction when said one of said buttons is moved in its inoperative position by said slide bar for positioning said tape in an operative relation with respect to the recording head provided by the recorder, means urging said movable means in said one direction, means for selecting the speed of travel of the tape as it is moved in either direction through the recorder by said moving means, and means actuated by the tape as it nears the end of its travel in one direction for actuating said slide bar and pivot bar for automatically reversing travel of the tape through the recorder by said moving means.

13. An automatic control for a dual directional tape recorder including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, and sensing fingers carried by said slide bar and disposed in the path of travel of the tape in either direction and adapted to sense the end connection of the tape to either tape reel as it moves from one reel to the other so as to effectively actuate said slide bar so as to pivot said pivot bar in an opposite direction to automatically reverse the direction of travel of the tape through the recorder.

14. An automatic control for a dual directional tape recorder having a recording head and including a plurality of push-buttons having operative and inoperative positions, said recorder providing a pair of spaced apart tape reel supporting spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, and a tape positioning member disposed in one direction when said one of said buttons is moved into its inoperative position by said slide bar for positioning the tape in operative relation with respect to the recording head provided by the recorder.

15. An automatic control for a dual directional tape recorder having a recording head and including a plurality of push-buttons having operative and inoperative positions, said recorder providing a pair of spaced apart tape reel support spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, sensing fingers carried by said slide bar and disposed in the path of travel of the tape in either direction and adapted to sense the end connection of the tape to either tape reel as it moves from one reel to the other so as to effectively actuate said slide bar so as to pivot said pivot bar in an opposite direction to automatically reverse the direction of travel of the tape through the recorder, and a tape positioning member disposed in one direction when said one of said buttons is moved into its inoperative position by said slide bar for positioning the tape in operative relation with respect to the recording head provided by the recorder.

16. An automatic control for a dual directional tape recorder having a recording head and including a plurality of push-buttons having operative and inoperative positions, said recorder providing a pair of spaced apart tape reel support spindles, means for moving a tape off one tape reel and on to another when the reels are supported on said spindles, said tape moving means including a pair of capstan pulleys rotatable in opposite directions and rotatably engaging a pair of pivotal idler wheels, means for pivotally connecting said idler wheels relative to said spindles, said moving means providing a pivot bar including a member carried thereby for engaging and alternately pivoting said idler wheels into operable rotatable engagement with one of said spindles so as to cause the tape to be wound upon a reel supported thereby, a slide bar operatively connected to said pivot bar and movable longitudinally in opposite directions by certain of said push-buttons when moved into their operative positions and adapted to pivot said pivot bar and said member carried thereby into engagement with one of said idler wheels to pivot the same into rotatable engagement with one of said spindles so as to cause the tape to move in one direction through the recorder, said moving means responsive to one of said buttons when in its operative position so as to be inoperative for causing the tape to be moved in either direction through the recorder, means on said slide bar for positioning said one of said buttons in its inoperative position when said slide bar is longitudinally moved in either direction by either of said certain of said buttons for effecting operation of said moving means for moving the tape through the recorder in either direction, sensing fingers carried by said slide bar and disposed in the path of travel of the tape in either direction and adapted to sense the end connection of the tape to either tape reel as it moves from one reel to the other so as to effectively actuate said slide bar so as to pivot said pivot bar in an opposite direction to automatically reverse the direction of travel of the tape through the recorder, a tape positioning member disposed in one direction when said one of said buttons is moved into its inoperative position by said slide bar for positioning the tape in operative relation with respect to the recording head provided by the recorder, means urging said disposed member in said one direction and means for selecting the speed of travel of the tape as it is moved in either direction through the recorder by said moving means.

17. An automatic control for tape recorder including a plurality of control members having operative and inoperative positions, tape moving means having an operative and an inoperative position, said moving means being responsive to one of said members when in its operative position so as to be inoperative for moving the tape through the recorder in either direction, selective means controlled by another of said members for releasing said one of said members to its inoperative position to enable said moving means to become operative to move said tape in a predetermined direction of travel through said recorder, and means actuated by said selective means for effecting actuation of said moving means including a power driven member and a trip member actuated by said selective means to engage said power member to drive said tape moving means to its operative position for moving said tape in said direction of travel through said recorder.

18. An automatic control for a dual directional tape recorder having spaced spindles receiving tape reels and a transmission for selectively rotating the spindles in opposite directions, a plurality of control members having operative and inoperative positions, a capstan, means having an operative and an inoperative position for moving a tape through said recorder including a capstan roller cooperating with said capstan, said moving means being inoperative to move the tape through the recorder in any direction in response to one of said members being in its operative position, selective means including another of said members for moving said one of said members into its inoperative position to permit said moving means to become operative to move said tape in a predetermined direction of travel through said recorder, means for moving said one of said members into its inoperative position and said tape moving means into its operative position with the capstan roller against the capstan including a power driven rotating element and a trip member, said trip member being actuated by said other member to engage said rotating element and propel said moving means to place the capstan roller against the capstan and said transmission to select a predetermined spindle to be rotated, and means for selecting the speed of travel of the tape as it is moved through the recorder by said moving means including another one of said members movable to shift the capstan roller out of contact with said capstan.

19. An automatic control for a dual directional tape recorder including a plurality of push-buttons having operative and inoperative positions, means having an operative and inoperative position for moving a tape through said recorder, said moving means responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, and means for automatically reversing the travel of the tape through the recorder including a rotating member and a trip element brought into engagement therewith by the tape as it nears the end of its travel in one direction for propelling said positioning means to an alternate position to reverse the direction of travel of the tape through the recorder.

20. An automatic control for a dual directional tape recorder including a plurality of push-buttons having operative and inoperative positions, means having an operative and inoperative position for moving a tape through said recorder, said moving means responsive to one of said buttons when in its operative position so as to be inoperative for moving the tape through the recorder in either direction, positioning means for moving said one of said buttons into an inoperative position so as to permit said moving means to become operative so as to move said tape in a predetermined direction of travel through said recorder, selective means for actuating said positioning means in a predetermined manner so as to position said one of said buttons in its inoperative position and for effecting operation of said moving means for moving said tape in a desired direction of travel through said recorder, means for selecting the speed of travel of the tape as it is moved in either direction through the recorder by said moving means, and means for automatically reversing the travel of the tape through the recorder including a rotating member and a trip element brought into engagement therewith by the tape as it nears the end of its travel in one direction for propelling said positioning means to an alternate position to reverse the direction of travel of the tape through the recorder.

21. In a tape recorder having a power driven rotating member, a tape transport means having an operative and a non-operative position, a manual control member having an operative and a non-operative position, actuating means movable a predetermined distance by said manual control member into engagement with said rotating member and propelled by said rotating member a further distance, said tape transport means being moved into its operative position by said actuating means by said propelled movement said further distance, and manual means for returning said control member and said tape transport means to their non-operative positions.

References Cited in the file of this patent

UNITED STATES PATENTS

| | | |
|---|---|---|
| 2,535,486 | Dank | Dec. 26, 1950 |
| 2,676,212 | Williams | Apr. 20, 1954 |